United States Patent
Laurent et al.

(10) Patent No.: US 9,293,021 B2
(45) Date of Patent: Mar. 22, 2016

(54) OBJECT MONITORING SYSTEM USING RADIOFREQUENCY IDENTIFICATION TAGS HAVING TAG-SPECIFIC IDENTIFIERS

(75) Inventors: Johann Laurent, Moelan sur Mer (FR); Jean-Philippe Diguet, Guidel (FR); Yvan Eustache, Melgven (FR)

(73) Assignee: CENTRE NATIONAL DE LA RECHERCHE SCIENTIFIQUE (C.N.R.S), Paris (FR)

( * ) Notice: Subject to any disclaimer, the term of this patent is extended or adjusted under 35 U.S.C. 154(b) by 185 days.

(21) Appl. No.: 13/994,975

(22) PCT Filed: Dec. 15, 2011

(86) PCT No.: PCT/EP2011/072940
§ 371 (c)(1),
(2), (4) Date: Sep. 16, 2013

(87) PCT Pub. No.: WO2012/080412
PCT Pub. Date: Jun. 21, 2012

(65) Prior Publication Data
US 2013/0342348 A1 Dec. 26, 2013

(30) Foreign Application Priority Data
Dec. 17, 2010 (FR) ...................................... 10 60744

(51) Int. Cl.
| G08B 13/14 | (2006.01) |
|---|---|
| G08B 13/24 | (2006.01) |
| G06Q 10/08 | (2012.01) |
| G08B 21/02 | (2006.01) |
| G08B 21/24 | (2006.01) |

(52) U.S. Cl.
CPC ............ *G08B 13/2462* (2013.01); *G06Q 10/08* (2013.01); *G08B 13/1427* (2013.01); *G08B21/02* (2013.01); *G08B 21/025* (2013.01); *G08B 21/0227* (2013.01); *G08B 21/0236* (2013.01); *G08B 21/0238* (2013.01); *G08B 21/24* (2013.01)

(58) Field of Classification Search
CPC .......... G08B 13/1427; G08B 13/2462; G08B 21/02; G08B 21/0227; G08B 21/0236; G08B 21/0238; G08B 21/025; G08B 21/24; G08B 13/2454; G06Q 10/08; G06Q 10/06; G06Q 10/087; G01S 11/16; G01S 13/86
USPC ............ 340/572.1, 572.2–572.9, 568.1, 10.1, 340/10.5, 10.6, 6.1, 8.1, 10.51, 573.1, 340/539.12, 539.26, 539.1, 10.52, 568.8
See application file for complete search history.

(56) References Cited

U.S. PATENT DOCUMENTS

| 4,952,928 A | * | 8/1990 | Carroll et al. ............... 340/10.41 |
| 5,710,932 A | * | 1/1998 | Hamanaka et al. ............. 712/14 |

(Continued)

FOREIGN PATENT DOCUMENTS

| CA | 2 529 618 | * | 9/2005 |
| CA | 2 529 618 A1 | | 6/2007 |

OTHER PUBLICATIONS

International Search Report, dated Jan. 16, 2012, from corresponding PCT application.

*Primary Examiner* — Daniel Previl
(74) *Attorney, Agent, or Firm* — Young & Thompson

(57) ABSTRACT

A system (2) for monitoring a plurality of objects (6) in a predefined detection area (8), includes:
a plurality of radiofrequency identification tags (4), each tag (4) being suitable for being attached onto an object (6),
at least one radiofrequency reader (10) for reading radiofrequency identification tags (4), the or each reader (10) being connected to an antenna (12), and all of the readers (10) defining the predefined detection area (8),
an element (16) for processing information transmitted by the or each radiofrequency reader (10), the information including an identifier specific to each tag (4) to be monitored in the predefined detection area (8), and
an alarm element (18) connected to the processing element, the monitoring system being characterized in that it includes a casing (14) that is impervious to the radiofrequency signals transmitted by the radiofrequency identification tags (4) located inside the casing (14).

13 Claims, 2 Drawing Sheets

(56) References Cited

U.S. PATENT DOCUMENTS

| | | | |
|---|---|---|---|
| 5,963,134 A * | 10/1999 | Bowers et al. | 340/572.1 |
| 6,225,906 B1 * | 5/2001 | Shore | 340/573.4 |
| 2002/0158751 A1 * | 10/2002 | Bormaster | 340/10.2 |
| 2004/0174264 A1 * | 9/2004 | Reisman et al. | 340/573.4 |
| 2007/0272746 A1 * | 11/2007 | Ortiz et al. | 235/385 |
| 2008/0106399 A1 * | 5/2008 | Yaqub et al. | 340/539.11 |
| 2009/0219160 A1 | 9/2009 | Shervey et al. | |
| 2009/0299857 A1 * | 12/2009 | Brubaker | 705/14.66 |

* cited by examiner

OBJECT MONITORING SYSTEM USING RADIOFREQUENCY IDENTIFICATION TAGS HAVING TAG-SPECIFIC IDENTIFIERS

BACKGROUND OF THE INVENTION

1. Field of the Invention

The present invention relates to a system for monitoring a plurality of objects in a predefined detection area, comprising:
- a plurality of radiofrequency identification tags, each tag being suitable for being attached onto an object,
- at least one radiofrequency reader for reading radiofrequency identification tags, the or each reader being connected to an antenna, and all of the readers defining the predefined detection area,
- a means for processing information transmitted by the or each radiofrequency reader, the information comprising an identifier specific to each tag to be monitored in the predefined detection area, and
- an alarm means connected to the processing means.

The invention applies to the field of monitoring goods or people.

Such systems make it possible to detect and quickly signal the disappearance or excessive removal of an item or an individual with respect to a predefined area.

For example, such systems are used in the maritime field, to monitor people and verify that they have not fallen overboard.

The systems must have a reduced size and weight so as for example to be integrated into equipment (sailing jackets, boots or in the form of bracelets, etc.). Furthermore, they must eliminate or minimize the need for human intervention.

2. Description of the Related Art

A maritime monitoring and alarm system is described in patent application US 2009/0219160 A1. This includes radiofrequency identification tags that use the RFID (radiofrequency identification) technology. These radiofrequency identification tags are worn by a person present on the boat. The system further comprises radiofrequency readers connected to directional aerials whereof the detection range for the radiofrequency identification tags delimits a monitoring and safety area.

One of the drawbacks of this system is that all of the radiofrequency identification tags, irrespective of whether they are associated with an object to be monitored, transmit and receive radiofrequency signals so as to identify them with radiofrequency readers integrated into the system. Thus, a significant stream of useless signals, i.e., those regarding tags not associated with an object to be monitored, is generated.

BRIEF SUMMARY OF THE INVENTION

The invention aims to offset these drawbacks by proposing a monitoring system reducing the number of communications and thereby making it possible to increase its monitoring effectiveness.

To that end, the invention relates to a monitoring system of the aforementioned type, characterized in that it comprises a casing that is impervious to the radiofrequency signals transmitted by the radiofrequency identification tags located inside the box.

According to specific embodiments, the monitoring system includes one or more of the following features, considered alone or in combination:
- the processing means is capable of transmitting an alert signal to the alarm means if at least one object to be monitored is outside the predefined detection area;
- the alarm means is capable of transmitting a visual and/or audible alarm signal upon receiving an alert signal;
- at least one antenna is omnidirectional;
- it comprises means for storing valid radiofrequency identification tag identifiers, the radiofrequency identification tags being valid if they have been purchased legally and in that the processing means is capable of verifying the validity of each radiofrequency identification tag to be monitored in the predefined detection area (8).

The invention also relates to a propulsion system for a vehicle, characterized in that it comprises an actuating means for the vehicle capable of cooperating with an alarm means of a monitoring system according to any one of claims 1 to 5 to slow the vehicle.

BRIEF DESCRIPTION OF THE DRAWINGS

The invention will be better understood upon reading the following description, provided solely as an example, and done in reference to the appended drawings, in which.

The invention relates to a monitoring system designed to be integrated for example into a maritime vehicle, such as a boat. The system makes it possible to detect and very quickly indicate the excessive removal of an object or individual from a predefined area.

Figure 1:
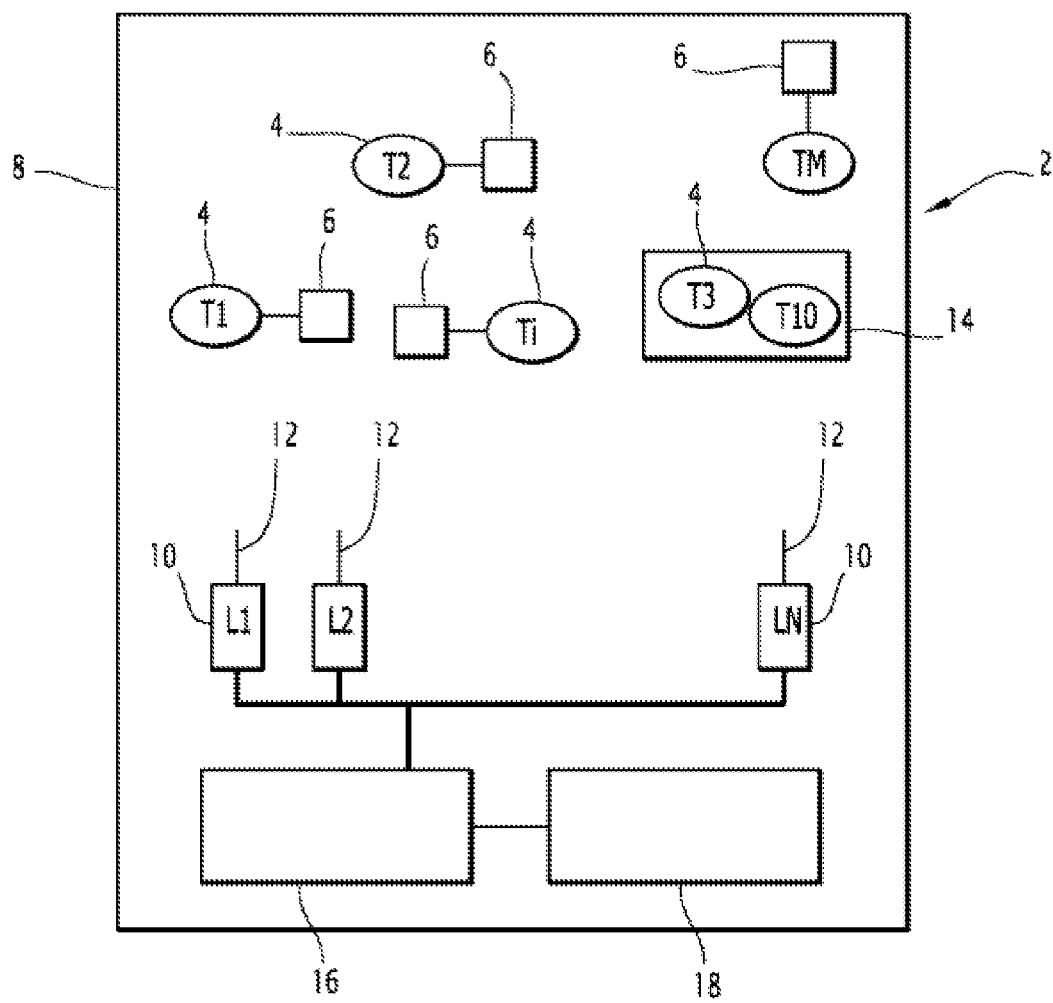
FIG. 1 is an overview diagram of a monitoring system according to the invention.

FIG. 1 illustrates a monitoring system 2 according to the invention that comprises at least one plurality of radiofrequency identification tags denoted T1 to TM and designated by general reference 4. Each radiofrequency tag 4 can be fastened to an object 6 to be monitored in a predefined detection area 8.

For example, these radiofrequency identification tags 4 use the RFID (radiofrequency identification) technology or the RuBee technology.

In a known manner, these tags include an active or passive marker.

The monitoring system 2 further comprises at least one radiofrequency reader 10 designed to read radiofrequency identification tags 4 only in the predefined detection area 8.

The set of readers 10 delimits the predefined detection area 8 corresponding to the monitoring area of a plurality of objects from the detection range of the set of readers, i.e., the maximum detection distance of the set of readers.

The or each reader 10 is connected to an antenna 12, for example a directional aerial or an omnidirectional antenna. Preferably, the antennas 12 are omnidirectional.

The monitoring system comprises at least one casing 14 that is impervious to the radiofrequency signals transmitted or received by the radiofrequency identification tags situated in the casing. The impervious casing 14 is situated in the predefined detection area 8 and can be fastened to the boat.

For example, in the context of an application to monitoring individuals at sea, the predefined detection area 8 is the boat. Thus, any individual identified with a radiofrequency identification tag, for example if it is fastened on an article of clothing that is being worn, and situated on the boat, is considered to be "safe." Once the man falls overboard, and leaves the predefined detection area 8, the system detects and transmits an alarm, as will be outlined hereafter.

This impervious casing 14 is capable of storing the radiofrequency identification tags not in use at a given moment, so that they are not detected by the at least one radiofrequency reader even if they are in the predefined detection area 8. The radiofrequency identification tags of the objects to be monitored are situated outside the impervious casing 14.

For example, the impervious casing 14 is a Faraday cage.

DETAILED DESCRIPTION OF THE PREFERRED EMBODIMENTS

The monitoring system 2 further comprises means 16 for processing information transmitted by the or each radiofrequency reader 10. The transmitted information includes an identifier unique to each radiofrequency identification tag 4 to be monitored in the predefined detection area 8.

The information processing means 16 is connected to the or each radiofrequency reader 10.

The monitoring system 2 includes a storage means connected to the processing means 16. The storage means is capable of storing information transmitted by the or each radiofrequency reader 10 and information predefined by an operator.

For example, the storage means is a database including the identifiers of the radiofrequency identification tags previously legally purchased.

The processing means 16 is capable of verifying the validity of each radiofrequency tag 4 to be monitored in the predefined detection area 8, i.e., that the radiofrequency identification tags have previously been legally purchased. The monitoring system 2 further comprises an alarm means 18 connected to the processing means 16.

The processing means 16 is capable of transmitting an alert signal to the alarm means 18 if at least one object 6 to be monitored is outside the predefined detection area.

The alarm means 18 is capable of transmitting a visual and/or audible alarm signal upon receiving an alert signal.

Furthermore and advantageously but optionally, the monitoring system 2 is capable of cooperating with a propulsion system of a vehicle, for example a boat. The propulsion system of the boat comprises a means for actuating the boat capable of cooperating with the alarm means 18 of the monitoring system 2 so as to slow the boat in case of reception of alarms signaled by the alarm means.

Figure 2:
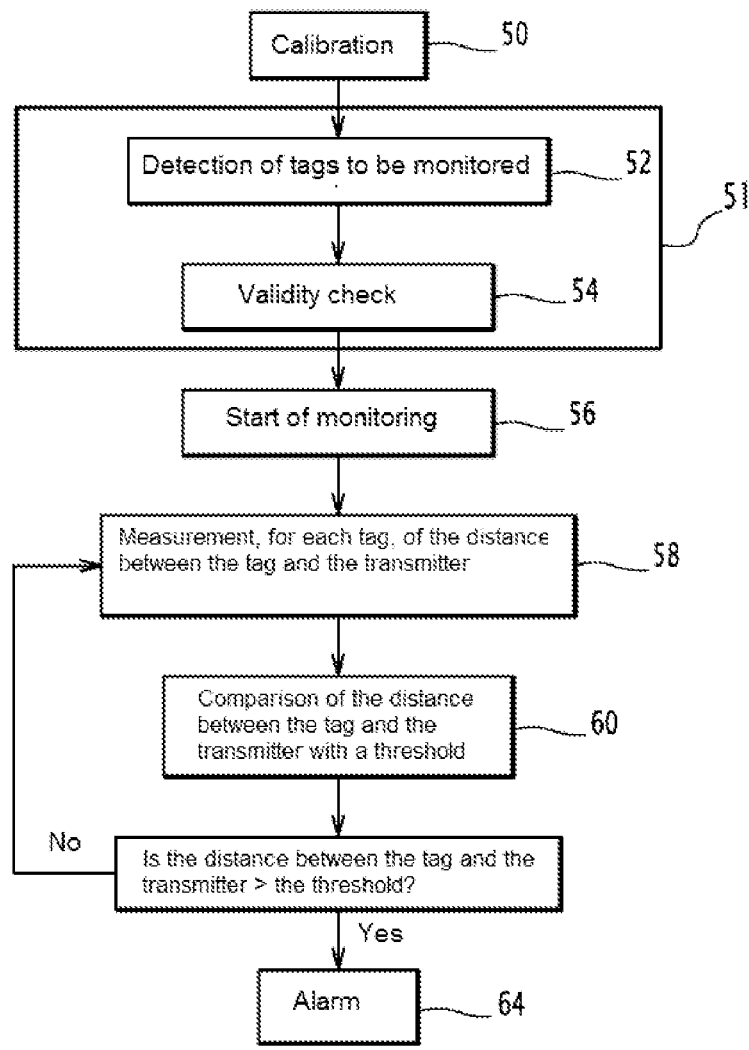
FIG. 2 is a block diagram illustrating the operation of the monitoring system according to the invention.

The operation of the monitoring system will now be described in light of FIG. 2.

First, during a calibration step 50, an operator defines the predefined detection area 8 or the area to be monitored as well as the alert distance, i.e., the distance after which the system must generate an alert signal. This distance between each radiofrequency identification tag situated safely in the predefined detection area 8 and at least one radiofrequency reader depends on the field of application. For example, it varies from several centimeters to several tens of meters.

For example, during this calibration step 50, an operator places the radiofrequency identification tags at the desired boundaries of the area to be monitored. Of course, the tags are placed at a distance smaller than the detection limit distance of the set of radiofrequency readers, so that the signals transmitted by the tags are then detected by at least one of the radiofrequency readers. The amplitudes of the detected signals are then recorded in the storage means of the monitoring system and the processing means ranks the amplitudes in order so as to identify the lowest amplitude associated with the tag placed furthest from the radiofrequency readers. This amplitude defines the alert threshold, and the associated alert distance is deduced therefrom in a known manner. This alert distance is then recorded in the storage means of the monitoring system.

Then, the monitoring system is activated during a step 51 including a step 52 for detecting tags to be monitored and a step 54 for verifying the validation of the detected tags.

During the step 52, the monitoring system detects the tags to be monitored, i.e., situated outside the impervious casing 14 and in the predefined detection area 8.

According to one alternative, the tags to be monitored are filled in by an operator, who enters that information in a database of the monitoring system after acquiring a usage right for a length of time, thereby defining the validity of the radiofrequency tags. Of course, the validity of the radiofrequency tags is associated with the length of the usage right, the duration being fixed or unlimited.

The processing means 16 of the system 2 then verifies the validity of the detected radiofrequency identification tags in step 54, i.e., the processing means 16 of the system verifies that the radiofrequency identification tags have previously been purchased legally and that they are therefore recorded in the database of the monitoring system 2 during commissioning thereof. Of course, radiofrequency identification tags may be added to or removed from the database of the monitoring system 2 after commissioning thereof, for example by an operator or by connecting to a wired or mobile network.

The monitoring system is then in the alert state as of the initiation of monitoring during a step 56.

During the monitoring, in a step 58, for each label, the distance between the radiofrequency identification tag and the at least one radiofrequency reader is measured as a function of the power of the signal transmitted by the radiofrequency tag and received by the or each reader.

Next, that tag/reader distance is compared to the predefined threshold during a step 60. The predefined threshold is the alert distance defined during the calibration step 50.

Lastly, if this distance is greater than the predefined threshold, or if at least one of the readers does not receive the signal transmitted by the radiofrequency identification tag, an alarm is generated during a step 64.

For example, in the context of a monitoring system for a boat, the alarm signal is a signal transmitted to the actuating means of the boat so as to slow said boat.

According to one alternative, the alert message is an audible and/or visual alarm, which triggers the dropping of life preservers, generates a distress message containing the GPS position and registration of the boat, for example by radio communication of the GSM, SMS, VHF type, etc.

One advantage of the monitoring system according to the invention is the reduced number of omnidirectional antennas, and therefore the price and easy deployment of the system by using non-directional aerials as opposed to directional aerials as indicated in patent U.S. 2009/0219160.

Furthermore, the impervious casing makes it possible to reduce the monitoring to the radiofrequency identification tags in use at the moment and not all of the tags in the system, which makes it possible to reduce potential false alarms and the stream of signals exchanged between the tags and the readers, and to thus adapt the system to different conditions. This thus makes it possible to limit the processing to information received only from useful tags, for example correspondent passengers on a boat equipped with such a monitoring system.

This also makes it possible to simplify the use of the monitoring system, since the step 51 for activating the system is carried out only once before beginning monitoring, for example before each time the boat goes out sea. This activation step 51 is for example done by pressing a single push-button, simplifying the use of such a monitoring system.

The invention is not limited to the example embodiment described and shown, and may in particular extend to other applications due to its reactivity, small bulk and nonintrusive nature.

The example embodiment was described in the context of safety onboard a boat. The monitoring system may nevertheless be used for to monitor bathing places, objects, or people in areas where moving further away indicates a potential danger, for example in particular in maternity hospitals, parks, and retirement homes (for dependent persons).

This monitoring system also allows dynamic and effective management of spots in a marina by providing real-time knowledge of the boats that are present or at sea when the radiofrequency identification tags are fastened to boats and the readers are situated in the marina.

The invention claimed is:

1. A monitoring system for monitoring a plurality of objects in a predefined detection area, comprising:
   a plurality of radiofrequency identification tags that transmit radiofrequency signals, each tag being suitable for being attached onto an object,
   a casing that is impervious to the radiofrequency signals transmitted by any of the radiofrequency identification tags that are located inside the casing,
   at least one radiofrequency reader for reading the radiofrequency identification tags located outside the casing, the or each radiofrequency reader being connected to an antenna, and all of the radiofrequency readers defining the predefined detection area, the or each radiofrequency reader being located outside the casing, the casing being located within the predefined detection area and the predefined detection area extending outside the casing,
   a processing device for processing information transmitted by the or each radiofrequency reader, the information comprising an identifier specific to each tag to be monitored in the predefined detection area, and
   an alarm device connected to the processing device.

2. The monitoring system according to claim 1, wherein the processing device is capable of transmitting an alert signal to the alarm device if at least one object to be monitored is outside the predefined detection area.

3. The monitoring system according to claim 2, wherein the alarm device is capable of transmitting a visual and/or audible alarm signal upon receiving an alert signal.

4. The monitoring system according to claim 1, wherein at least one antenna is omnidirectional.

5. The monitoring system according to claim 1, further comprising a storing device for storing valid radiofrequency identification tag identifiers, the radiofrequency identification tags being valid when the radiofrequency identification tags have been purchased legally, and wherein the processing device verifies the validity of each radiofrequency identification tag to be monitored in the predefined detection area.

6. A monitoring system according to claim 1, wherein at least one of the radiofrequency identification tags is located inside the casing.

7. A monitoring system according to claim 6, wherein the processing device for processing information transmitted, and the alarm device are located outside the casing.

8. A monitoring system according to claim 1, wherein the processing device for processing information transmitted, and the alarm device are located outside the casing.

9. A propulsion system for a vehicle, comprising a monitoring system for monitoring a plurality of objects in a predefined detection area, said monitoring system comprising:
   a plurality of radiofrequency identification tags that transmit radiofrequency signals, each tag being suitable for being attached onto an object,
   a casing that is impervious to the radiofrequency signals transmitted by any of the radiofrequency identification tags that are located inside the casing,
   at least one radiofrequency reader for reading the radiofrequency identification tags located outside the casing, the or each radiofrequency reader being connected to an antenna, all of the radiofrequency readers defining the predefined detection area, the or each radiofrequency reader being located outside the casing, the casing being located within the predefined detection area and the predefined detection area extending outside the casing,
   a processing device for processing information transmitted by the or each radiofrequency reader, the information comprising an identifier specific to each tag to be monitored in the predefined detection area, and
   an alarm device connected to the processing device.

10. A propulsion system for a vehicle according to claim 9, comprising an actuator for the vehicle, said actuator being capable of cooperating with the alarm device of the monitoring system to slow the vehicle.

11. A propulsion system for a vehicle according to claim 9, wherein at least one of the radiofrequency identification tags is located inside the casing.

12. A propulsion system according to claim 11, wherein the processing device for processing information transmitted, and the alarm device are located outside the casing.

13. A propulsion system according to claim 9, wherein the processing device for processing information transmitted, and the alarm device are located outside the casing.

* * * * *